US008230418B2

(12) United States Patent
Takatsu et al.

(10) Patent No.: US 8,230,418 B2
(45) Date of Patent: Jul. 24, 2012

(54) COMPUTER PROGRAM PRODUCT FOR EVALUATING THE WORKLOADS OF INSTALLATION PLANS IN QUANTITY BY BUILDING A PRE-REQUISITE RELATION KNOWLEDGE-BASE

(75) Inventors: Noriaki Takatsu, Tokyo (JP); Takeshi Akamatsu, Chofu (JP)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 12/187,708

(22) Filed: Aug. 7, 2008

(65) Prior Publication Data

US 2010/0037217 A1    Feb. 11, 2010

(51) Int. Cl.
*G06F 9/445* (2006.01)
*G06F 9/44* (2006.01)
(52) U.S. Cl. .......................................... 717/174; 707/706
(58) Field of Classification Search .......... 717/168–177; 707/706
See application file for complete search history.

(56) References Cited

U.S. PATENT DOCUMENTS

| | | | |
|---|---|---|---|
| 6,385,766 B1 * | 5/2002 | Doran et al. .................. | 717/174 |
| 6,560,776 B1 * | 5/2003 | Breggin et al. ............... | 717/176 |
| 6,735,767 B1 * | 5/2004 | Bleizeffer et al. ............ | 717/174 |
| 6,986,135 B2 * | 1/2006 | Leathers et al. .............. | 717/177 |
| 7,210,143 B2 * | 4/2007 | Or et al. ....................... | 717/174 |
| 7,246,351 B2 * | 7/2007 | Bloch et al. .................. | 717/175 |
| 7,318,226 B2 * | 1/2008 | Chefalas et al. ............. | 717/171 |
| 7,392,522 B2 * | 6/2008 | Murray et al. ................ | 717/174 |
| 7,526,508 B2 * | 4/2009 | Tan et al. ............................. | 1/1 |
| 7,536,686 B2 * | 5/2009 | Tan et al. ...................... | 717/174 |
| 7,603,668 B2 * | 10/2009 | Zweifel et al. ............... | 717/174 |
| 7,676,806 B2 * | 3/2010 | Curtis et al. .................. | 717/177 |
| 7,685,191 B1 * | 3/2010 | Zwicky et al. ................ | 707/706 |
| 7,856,631 B2 * | 12/2010 | Brodkorb et al. ............. | 717/177 |
| 7,890,946 B2 * | 2/2011 | Blumfield et al. ............. | 717/171 |
| 7,899,803 B2 * | 3/2011 | Cotter et al. .................. | 707/706 |
| 7,900,201 B1 * | 3/2011 | Qureshi et al. ................ | 717/174 |
| 8,069,441 B2 * | 11/2011 | Iizuka ........................... | 717/174 |
| 8,087,013 B2 * | 12/2011 | Kelly et al. ................... | 717/168 |
| 8,132,166 B2 * | 3/2012 | DeHaan ........................ | 717/177 |

OTHER PUBLICATIONS

George et al, "Secure buffering in firm real time database systems", The VLDB Journal, 8, pp. 178-198, 2000.*
Johnsten et al, "A methodology for hiding knowledge in databases", IEEE, pp. 1-9, 2002.*
Higa et al, "An object oriented methodology for knowledge base/database coupling", Comm. of the ACM, vol. 35, No. 6, pp. 99-113, 1992.*
Takahashi et al, "Web based knowledge database construction method for supporting design", ACM iiWAS, pp. 575-578, 2008.*

* cited by examiner

*Primary Examiner* — Anil Khtri
(74) *Attorney, Agent, or Firm* — Cantor Colburn LLP; John Flynn

(57) ABSTRACT

A first embodiment of the invention includes a computer program product including machine executable instructions stored on machine readable media, the instructions for providing an installation plan for installing at least one application in at least one processing system, by implementing a method. The method includes loading a configuration management database (CMDB) for the processing system, the CMDB including a pre-requisite relations knowledge database and a configuration information database. The method also includes receiving installation data for an installation of the at least one application and determining one or more installation plans for the installation of the application based upon the CMDB and the installation data. The method further includes displaying the one or more installation plans to a user, including an indication of a best installation plan.

11 Claims, 15 Drawing Sheets

US 8,230,418 B2

COMPUTER PROGRAM PRODUCT FOR EVALUATING THE WORKLOADS OF INSTALLATION PLANS IN QUANTITY BY BUILDING A PRE-REQUISITE RELATION KNOWLEDGE-BASE

BACKGROUND

1. Field of the Invention

The present disclosure relates generally to installation of software in a complex environment, and in particular, to managing prerequisite relationships during installation processes.

2. Description of the Related Art

In a complex computing environment, such as one involving a network server hosting a variety of software applications, many complex relationships exist. For example, many software applications create and require relationships with components of an operating system. The complexity is exacerbated by the addition of software having different architectures, such as software provided by multiple vendors.

Accordingly, installation of updates, upgrades, revisions, new additions or even additional software can be perilous for other software applications. More specifically, a problem arises when an installation procedure for an application perturbs resources needed by another application. Inevitably, this can lead to troubleshooting of existing programs once an installation has been performed.

In short, it is difficult to find the best installation plan for software due to complex relationships. For example, there may be some cases where a better solution is to upgrade the release level of the installed software before installing new software.

In an effort to alleviate many problems that have arisen in the implementation of non-standard software, the Information Technology Infrastructure Library (ITIL) has been devised and is continuously updated. The ITIL includes a configuration management data-base (CMDB) for configuration management. Unfortunately, current implementations of configuration management data-bases do not adequately provide solutions for installation problems as described above.

Therefore, what are needed are techniques for managing changes to configurations during software removal, installation or upgrades.

BRIEF SUMMARY

A first embodiment of the invention includes a computer program product including machine executable instructions stored on machine readable media, the instructions for providing an installation plan for installing at least one application in at least one processing system, by implementing a method. The method includes loading a configuration management database (CMDB) including pre-requisite relations knowledge base and a configuration information database with workload information and skill information for installation of the at least one application; and using the loaded information to select the installation plan.

Another embodiment of the invention includes a computing system for managing installation of at least one application, the system includes a processing system including a processor, a storage, and memory, with at least one additional application stored in the storage. The system also includes a computer program product including machine executable instructions stored on machine readable media, the instructions for providing an installation plan for installing at least one installation application in at least one processing system, by implementing a method. The method includes loading a configuration management database (CMDB) including pre-requisite relations knowledge base and a configuration information database with workload information and skill information for installation of the at least one installation application and using the loaded information to select the installation plan.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Figure 1:
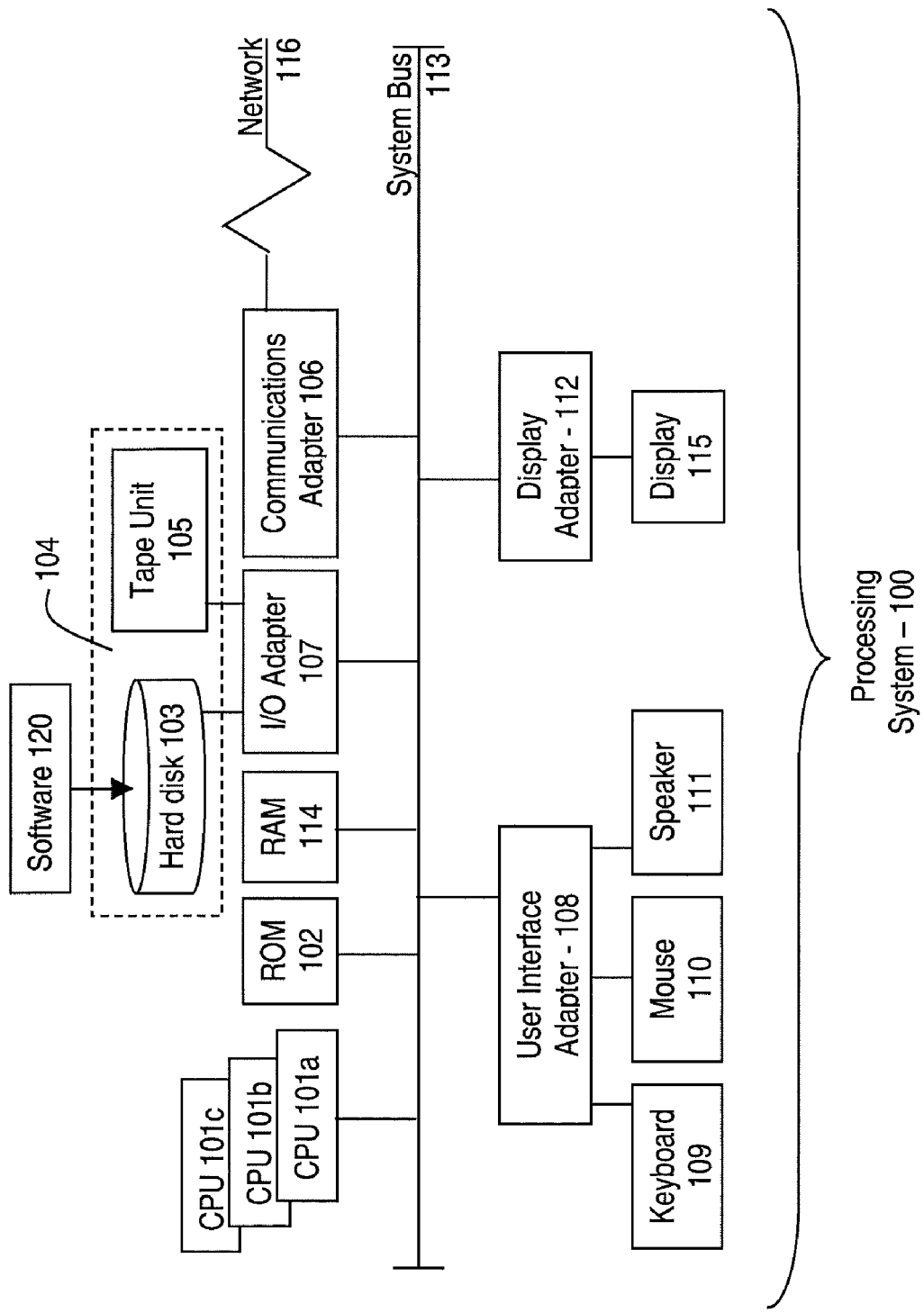
FIG. 1 illustrates one example of a processing system for practice of the teachings herein.
Figure 2:
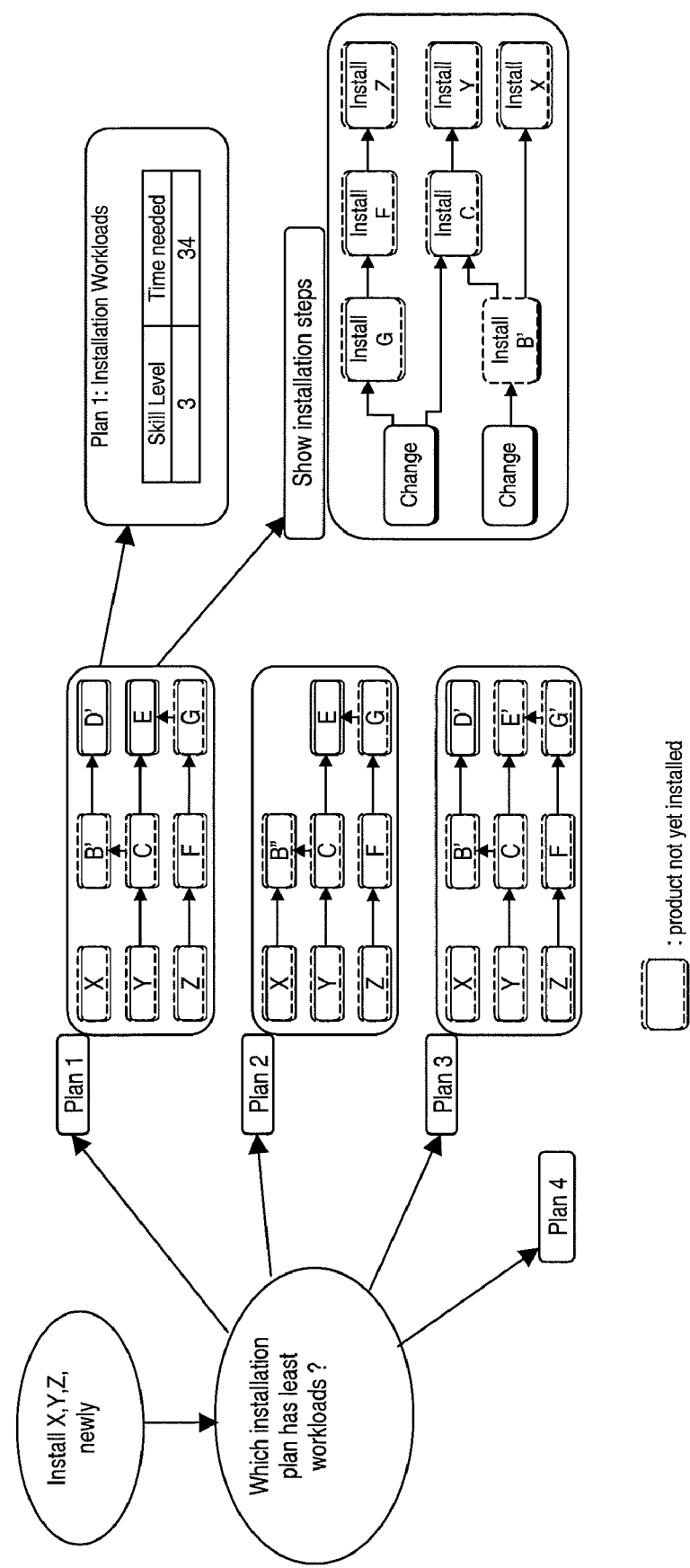
FIG. 2 illustrates an example of software relationships for consideration during installation of additional software.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI)

adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device.

Examples of operating systems that may be supported by the system 100 include Windows 95™, Windows 98™, Windows NT 4.0™, Windows XP™, Windows 2000™, Windows CE™, Windows Vista™, Macintosh™, Java™, LINUX™, and UNIX™, or any other suitable operating system. The system 100 also includes a network interface 106 for communicating over a network 116. The network 116 can be a local-area network (LAN), a metro-area network (MAN), or wide-area network (WAN), such as the Internet or World Wide Web, or any other type of network 116. p Users of the system 100 can connect to the network 116 through any suitable network interface 106 connection, such as standard telephone lines, digital subscriber line, LAN or WAN links (e.g., T1, T3), broadband connections (Frame Relay, ATM), and wireless connections (e.g., 802.11(a), 802.11(b), 802.11 (g)).

Of course, the processing system 100 may include fewer or more components as are or may be known in the art or later devised.

As disclosed herein, the system 100 includes machine readable instructions stored on machine readable media (for example, the hard disk 104) for capture and interactive display of information shown on the screen 115 of a user. As discussed herein, the instructions are referred to as "software" 120. The software 120 may be produced using software development tools as are known in the art. Also discussed herein, the software 120 may also referred to as an "installation manager" 120, a "module" 120 or by other similar terms. The software 120 may include various tools and features for providing user interaction capabilities as are known in the art.

In some embodiments, the software 120 is provided as an overlay to another program. For example, the software 120 may be provided as an "add-in" to an application (or operating system). Note that the term "add-in" generally refers to supplemental program code as is known in the art. In such embodiments, the software 120 may replace structures or objects of the application or operating system with which it cooperates.

The software 120 generally provides users with a capability to thoroughly and automatically evaluate installation plans for installation of software upgrades, additions and modifications. Commands may be native to (written to function within) computer application code programs (for example, C, C++, Perl, XML, HTML and others), other programs typically regarded as computing environments (UNIX, LINUX, DOS, and others) as well as other types of programs.

As a matter of convention herein, it is considered that the "software" 120 provides for management of installation of other computer applications. It is recognized that computer code is commonly regarded as software, however, in the interest of avoiding confusion, use of the term "software" is generally limited to describing embodiments of computer implemented instructions and computer program products that provide for management of installation of other computer applications. Accordingly, as discussed herein, "applications" or "products" are generally targeted for management by the software 120. Also, as discussed herein, "installation" generally refers to at least one of installation, updating, removing, manipulating, or otherwise performing some aspect of management of an application or product. Accordingly, the term "installation" is not limiting of the invention provided herein.

The software 120 provides users with a tool for assisting with installation, addition, modification, removal or other manipulation of applications operated in a processing system 100. Generally, the software 120 provides for evaluation of possible installation plans in light of complex pre-requisite relations between the various applications installed or used in the processing system 100.

Figure 3:
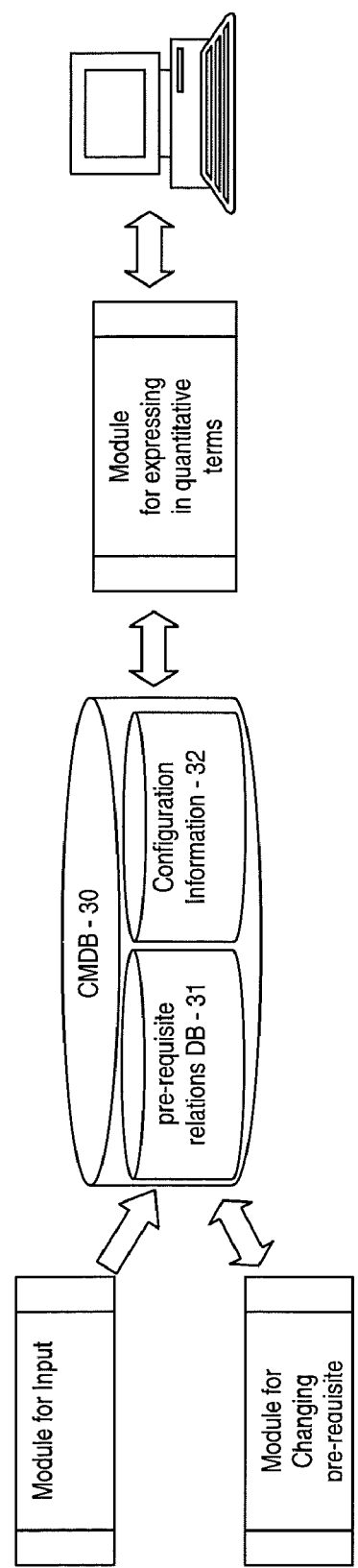
FIG. 3 illustrates aspects of the invention and a configuration management database.

In general, and with reference to FIG. 3, the software 120 includes enhancements to a configuration management database (CMDB) 30. The enhancements provide for storing and tracking information necessary of evaluating the complex relationships between applications, operating systems and other instructions. More specifically, the software 120 calls for constructing a pre-requisite relations knowledge base 31 as a component of the CMDB 30. Applications and/or components of applications in any processing system 100 can be registered in the pre-requisite relations knowledge base 31 and a configuration information database 32. Registration includes attribute and other such information as deemed appropriate. Exemplary attributes stored in the pre-requisite relations knowledge base 31 are quantitative skill level and workload information (e.g., time needed for execution of an installation activity).

Once the pre-requisite relations knowledge base 31 and the configuration information database 32 are populated, the invention provides for using the information to develop installation plans. As an example, modules may be enabled to show a best installation plan according to a quantitative indication such as, for example, minimal workload. Thus, the modules may be used to evaluate the possible installation plans by expressing their workloads in quantitative regards, instructing users in selection of installed products/relations and assignment of software in the or associated processing systems 100. The modules are generally enabled for showing installation steps for each installation plan. The showing will generally occur via an associated display 115 (such as by, for example, a graphical user interface). An exemplary table of application pre-requisites is provided in Table 1. The equivalent information provided in Table 1 can be expressed in International Development Markup Language (IDML). In the Table 1, Local flag indicates whether the pre-requisite product must be located in the same machine or not. For example, Tivoli Access Mgr for Integration needs Prod2 as a pre-requisite product but the Prod 2 can be installed in any other machine.

TABLE 1

Application Pre-Requisites

| | | | | | For Installation | | Pre-Requisite Product | | | |
|---|---|---|---|---|---|---|---|---|---|---|
| Prod. Name | Alias | Ver. | Patch | Platform | Skill Lvl | Time | Local | Name | Ver. | Patch | Platform |
| Tivoli Access Mgr. for O/S | | 6.1 | | | 2 | 10 | Yes | Prod1 | | | |
| | | 5.1 | | | 3 | 5 | | | | | |
| Tivoli Access Mgr. for Integration | | 5.1 | | | | | No | Prod2 | | | |

With regard to Table 1, various modules may be provided. For example, a module for input may receive information such as contained in Table 1 and provide this to the CMDB 30. A module for making pre-requisite relations may be included and used, as an example, to add and change pre-requisite relations between the applications and products that were already registered and further to add releases and patches for the applications and products that were already registered. Another module may be included for expressing quantitative aspects of installation processes. For example, the module may be used to express installation workloads for the specified group of applications and products in quantity, re-configure aspects as updates occur, show installation steps and further to show a time chart for each of the installation steps.

Figure 4:
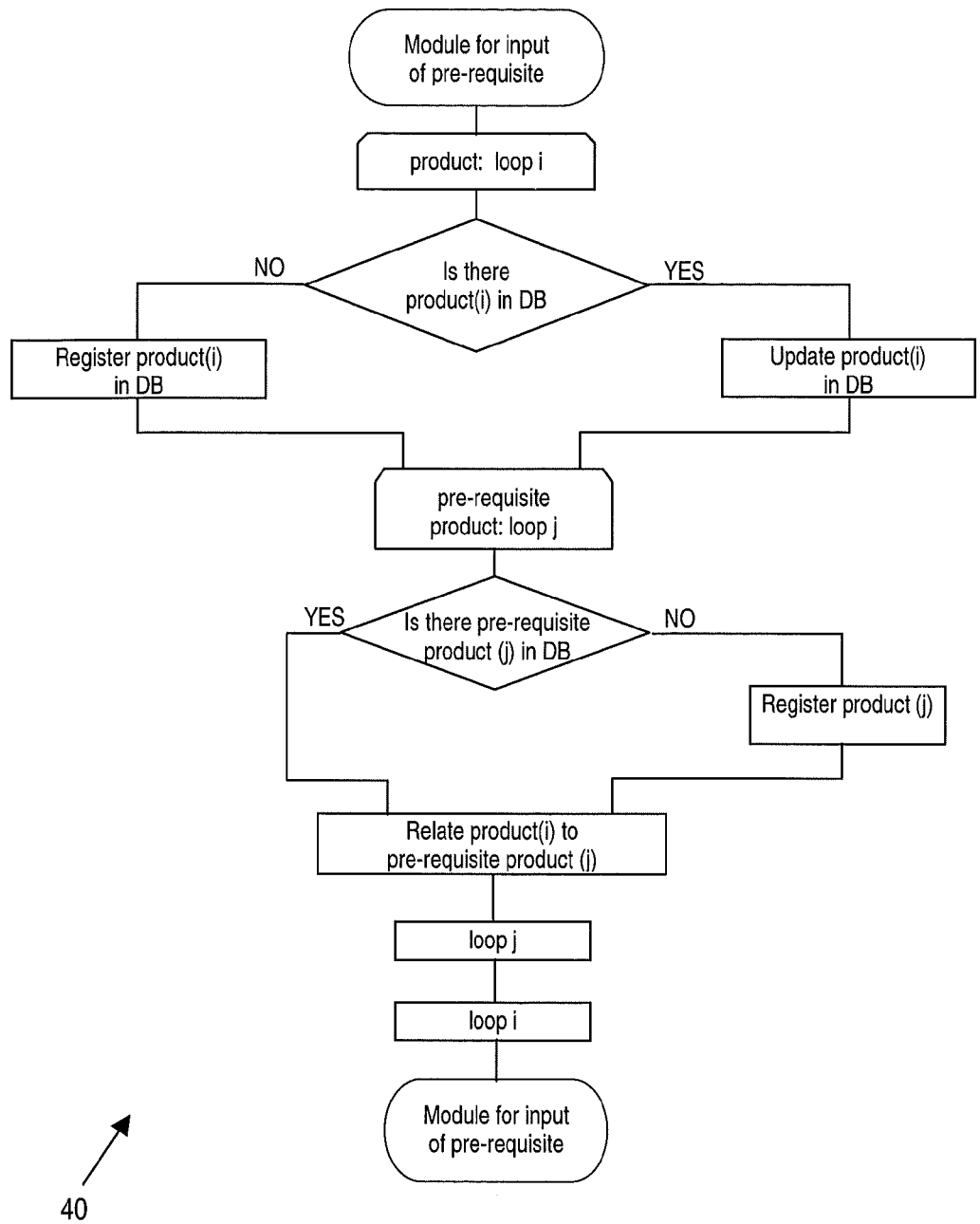
FIG. 4 is a flow chart with an exemplary procedure for creating pre-requisite relations database from pre-requisite relations information as input.

A process for updating the CMDB 30 with pre-requisite information includes: reading input data and preparing data for update; registering the pre-requisite relation if is a new one; updating the existing relation if it is an existing one; defining the configuration information for the application or product together with associated attributes; registering the application or product in the pre-requisite knowledge base 31 if it is not yet registered; implementing a pre-requisite relation by using a function such as a "dependsOnOneOfThem" or "dependsOn" function, such as may be selected from CMDB functions (the "dependsOnOneOfThem" function being associated with multiple dependencies, and the "dependsOn" function being associated with a singular dependency). This is shown in more detail in FIG. 4.

Figure 5:
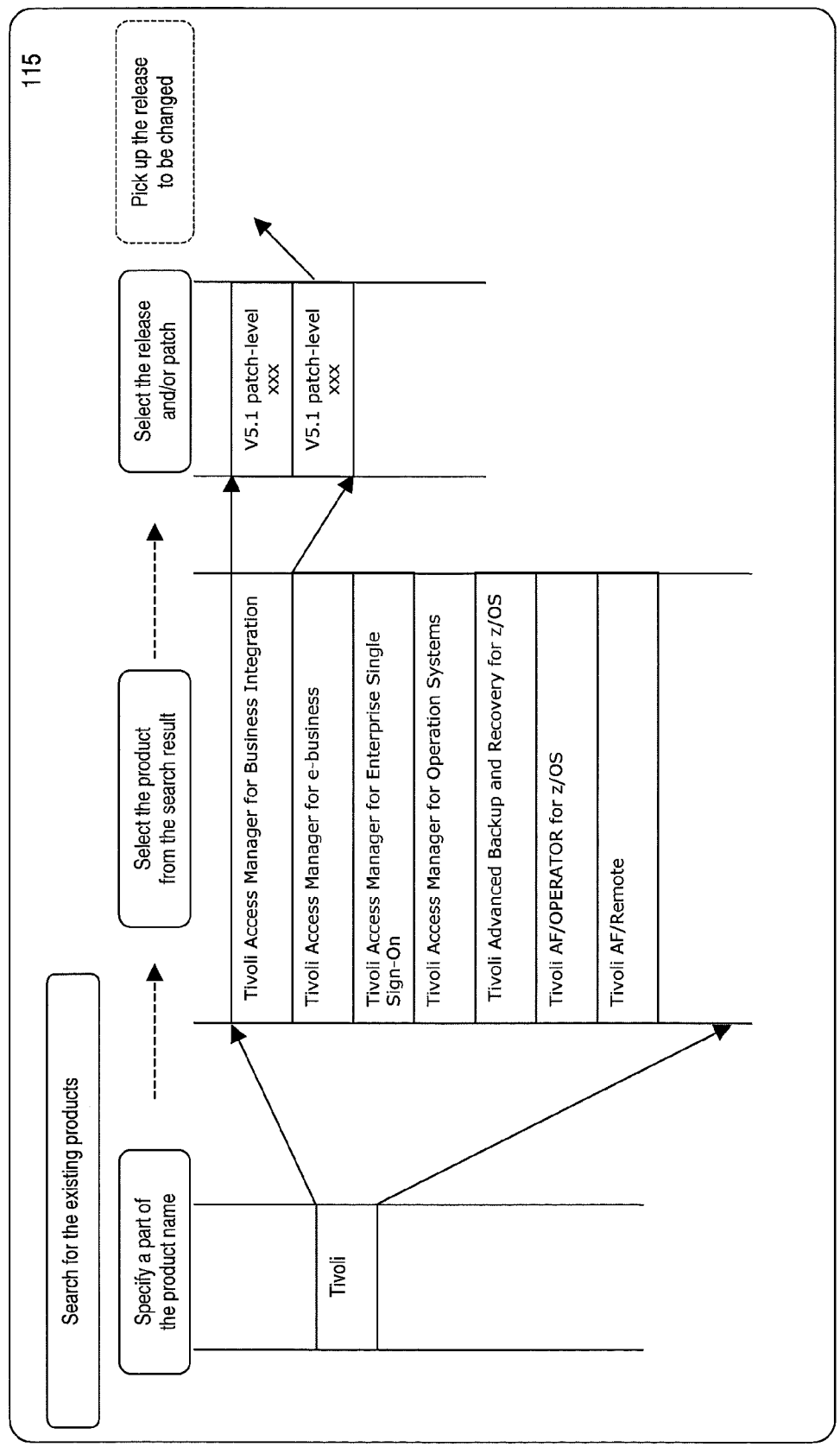
FIG. 5 provides an exemplary display of an interface for changing pre-requisite relations in pre-requisite relations DB.

FIG. 5 provides an exemplary user interface as may be shown on the display 115. The interface provides for adding or changing pre-requisite relations between the products already registered and adding or changing releases and/or patches for the applications or products already registered.

Figure 6:
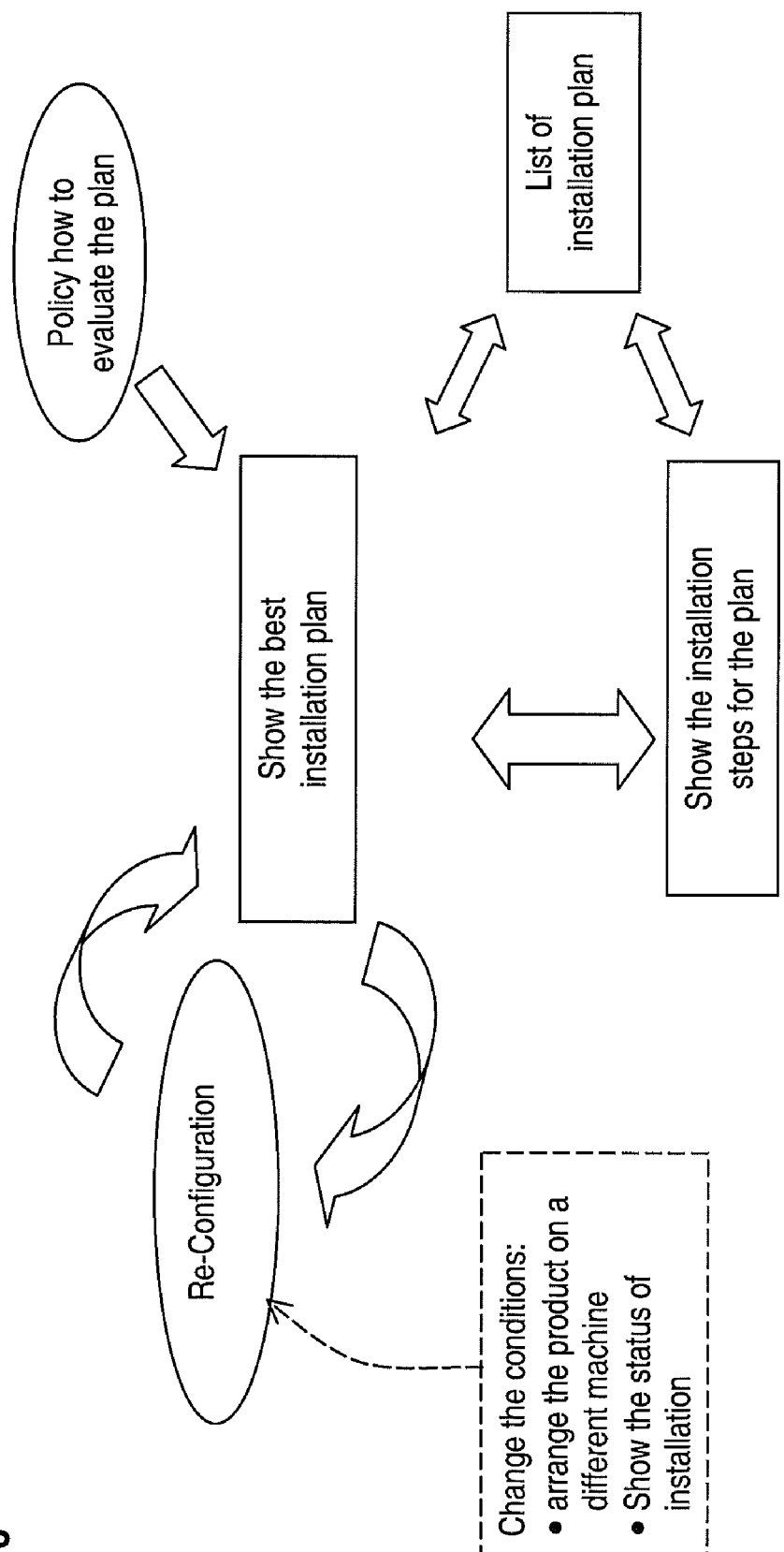
FIG. 6 illustrates aspects of a module evaluating works in quantity.
Figure 7:
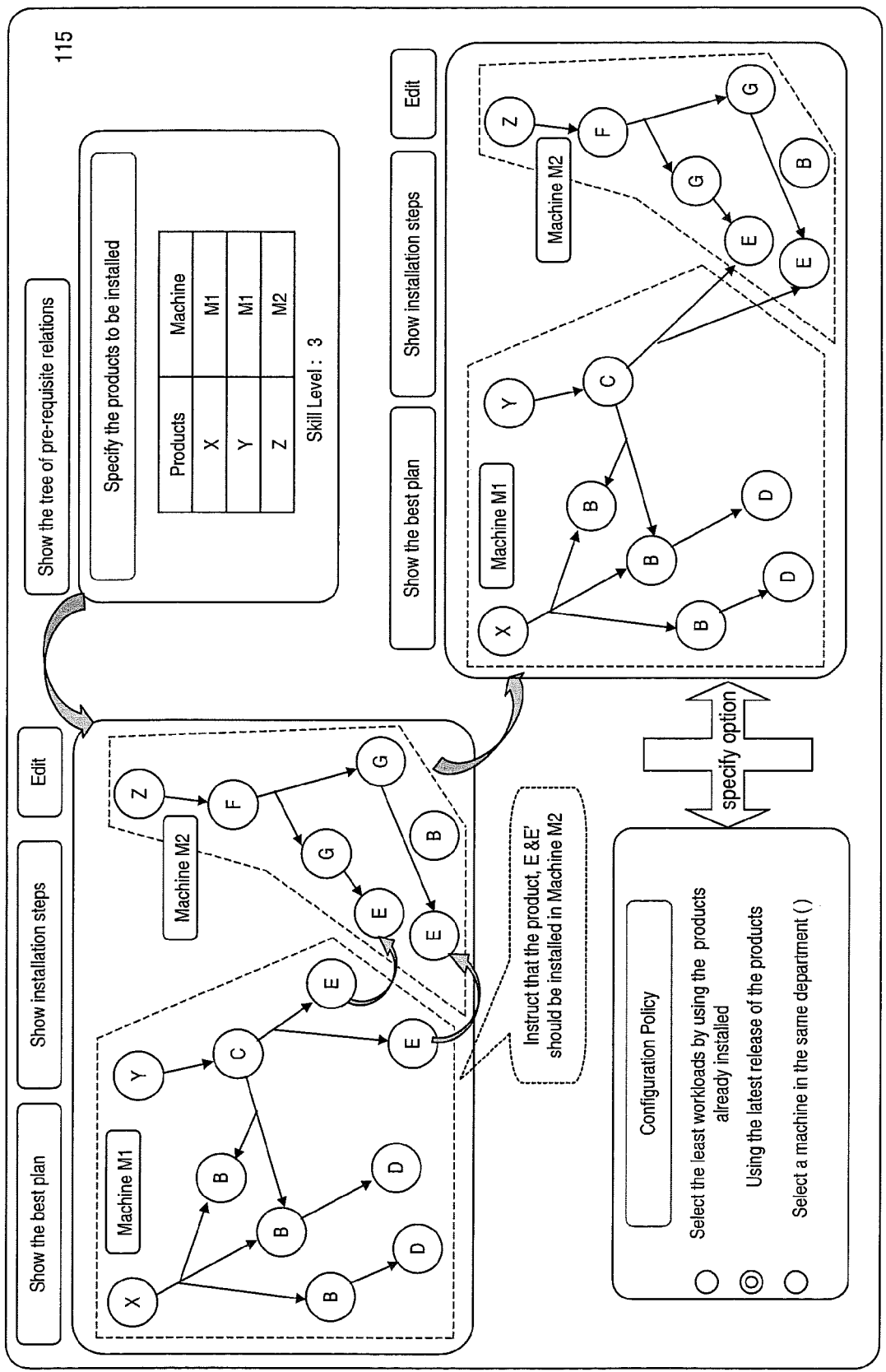
FIGS. 7-9 provides an exemplary display of an interface for showing a configuration of installation.
Figure 8:
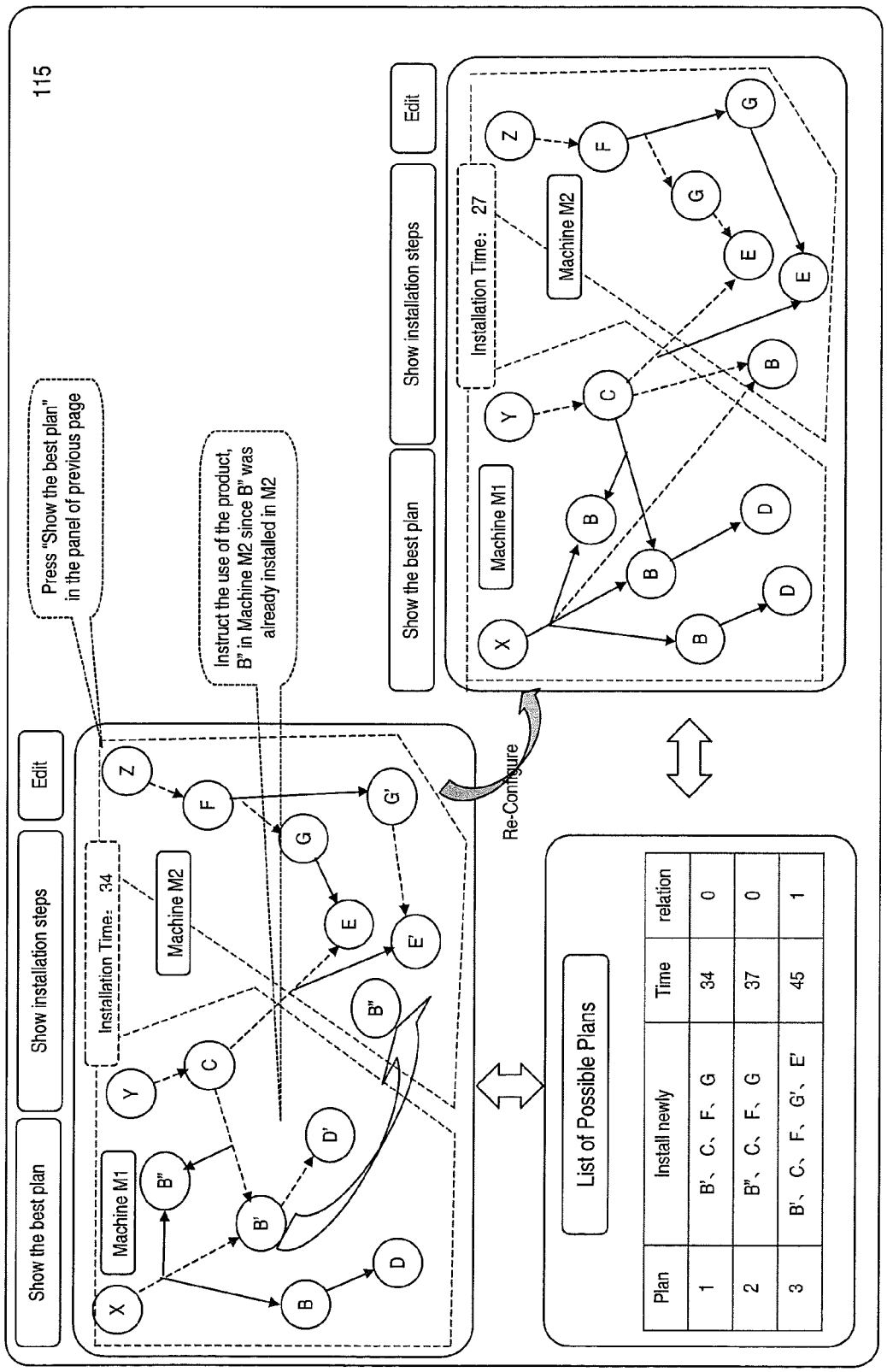
Figure 9:
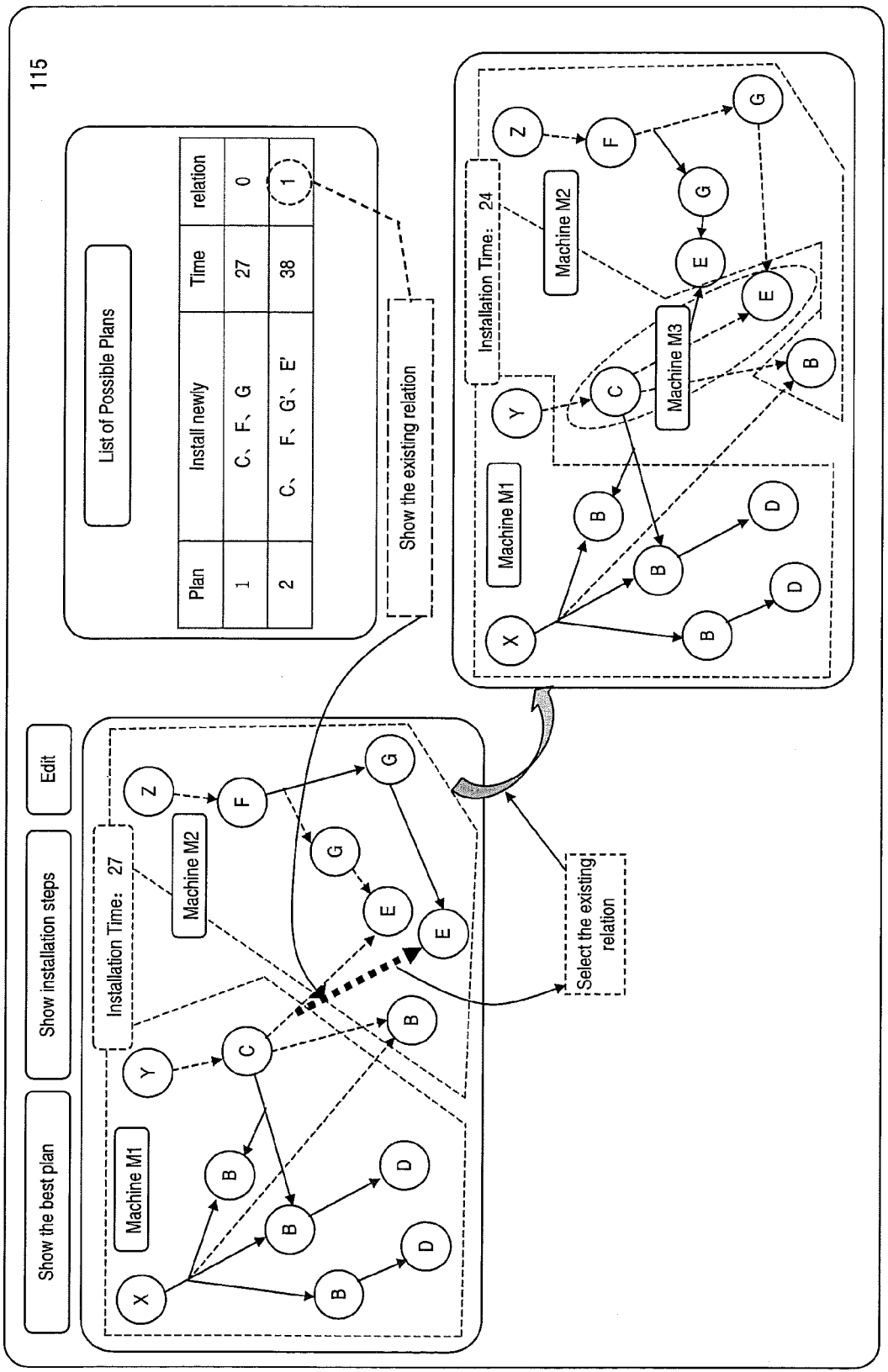
Figure 10:
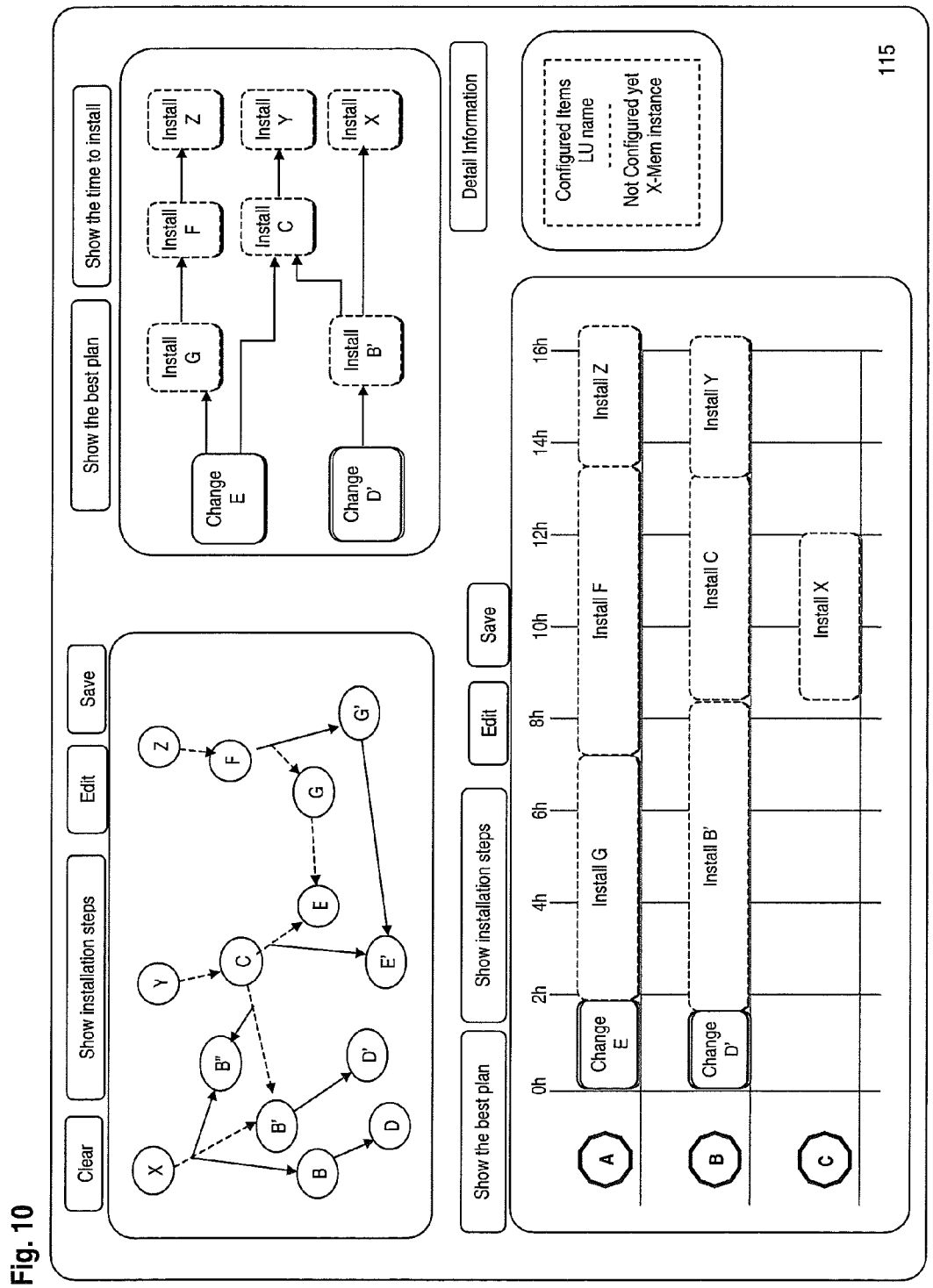
FIG. 10 provides an exemplary display of an interface showing installation steps.
Figure 11:
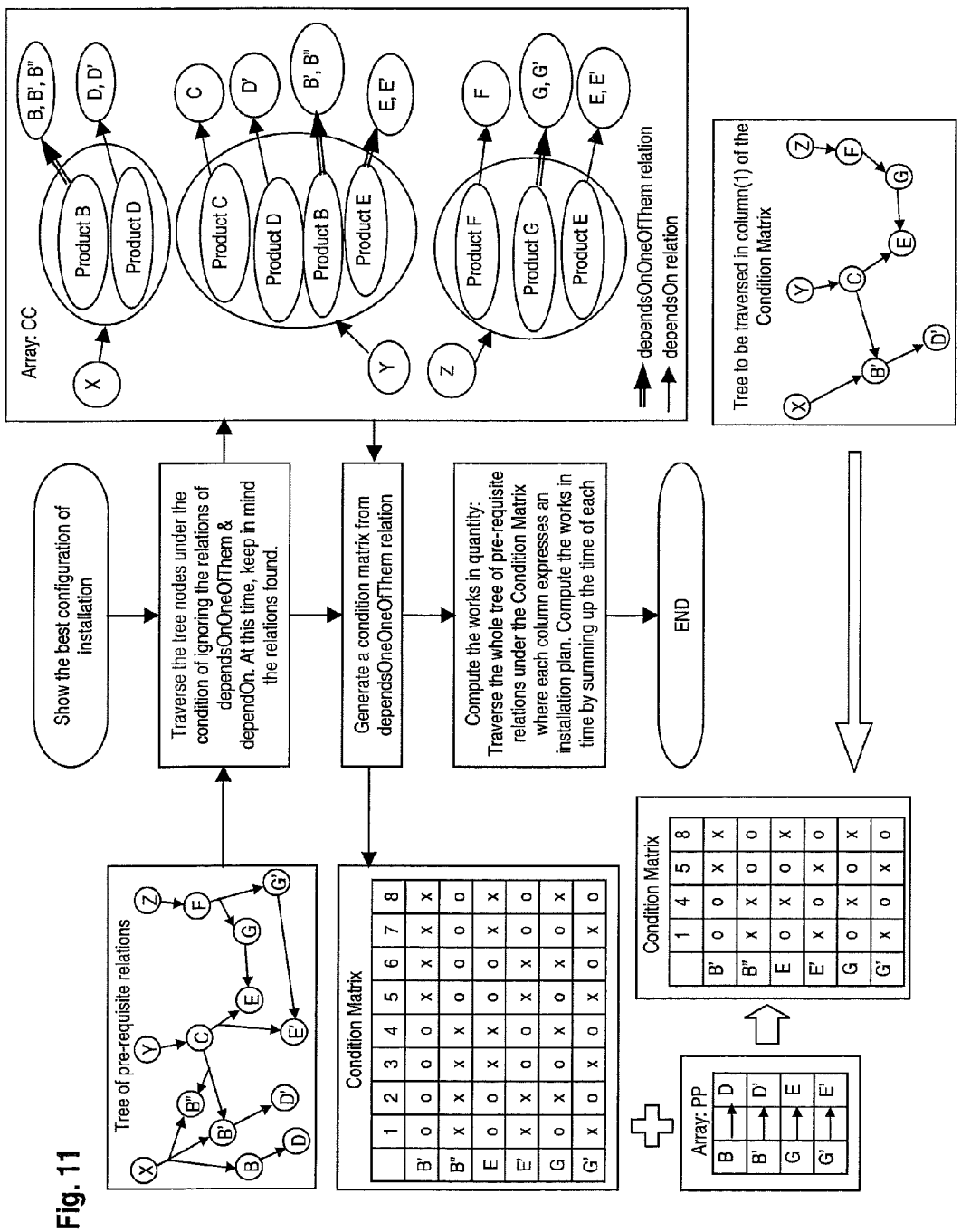
FIG. 11 provides a flow chart for showing a best configuration of installation.
Figure 12:
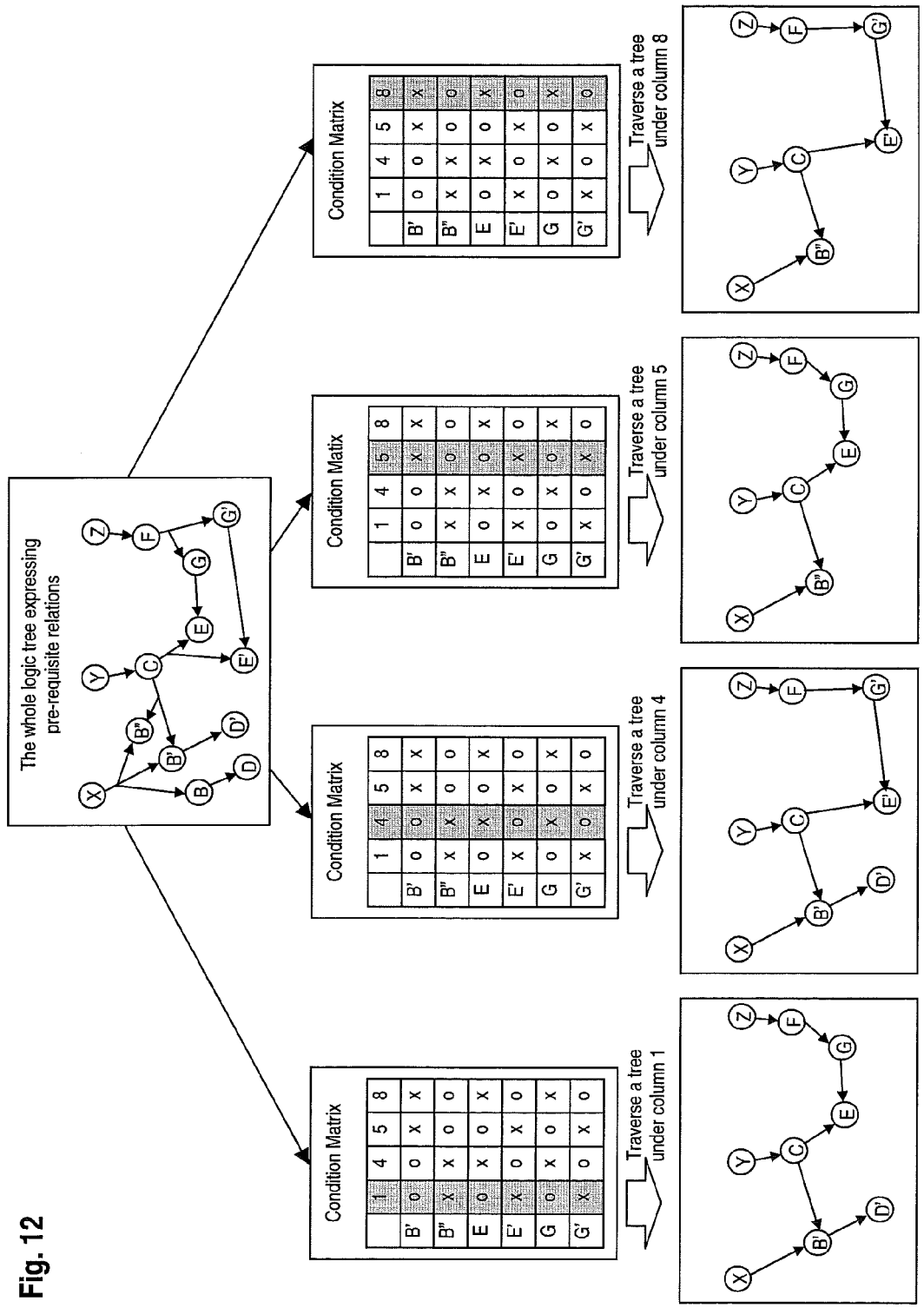
FIGS. 12-15 provide logical analyses for generating condition matrices and evaluating each installation plan.
Figure 13:
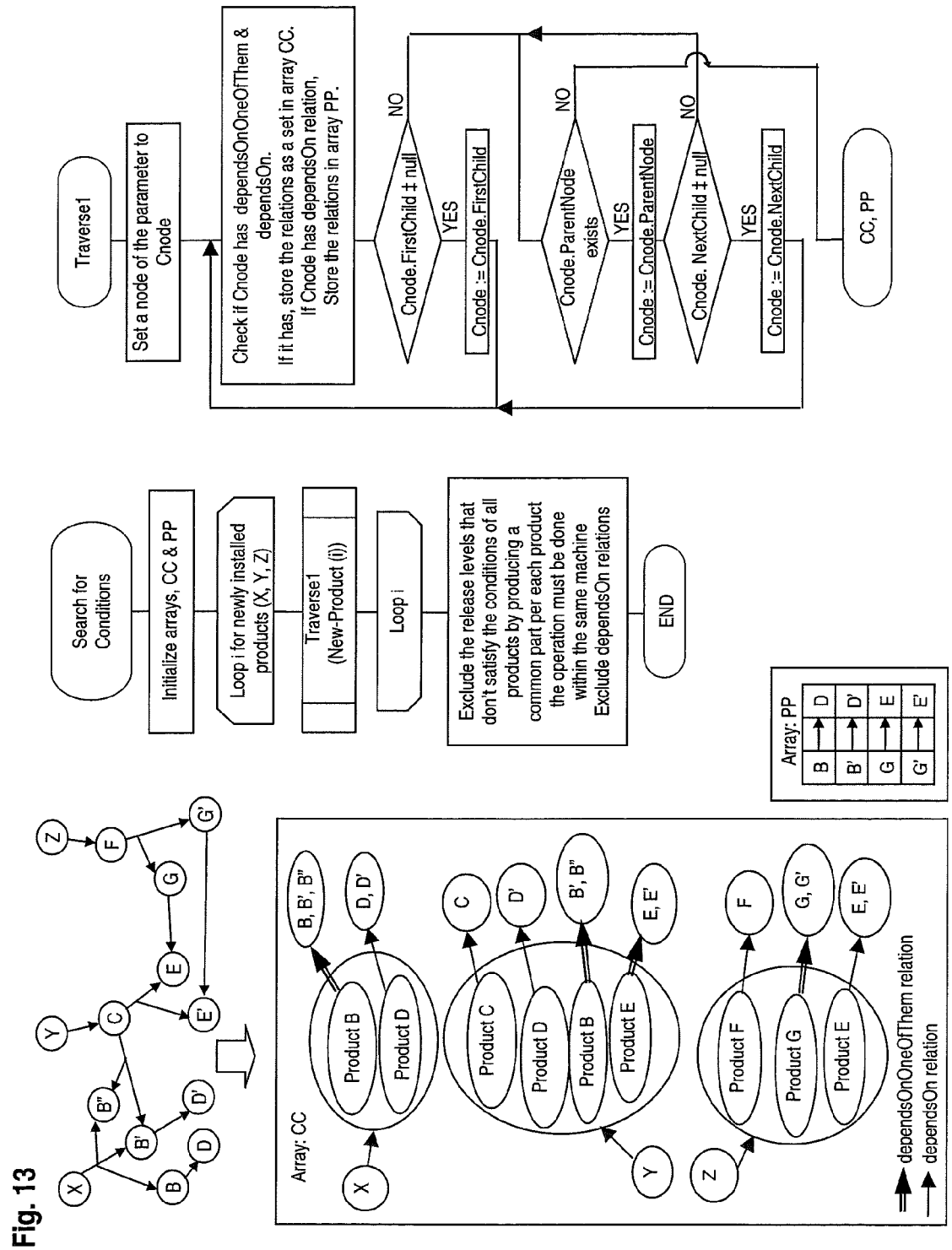
Figure 14:
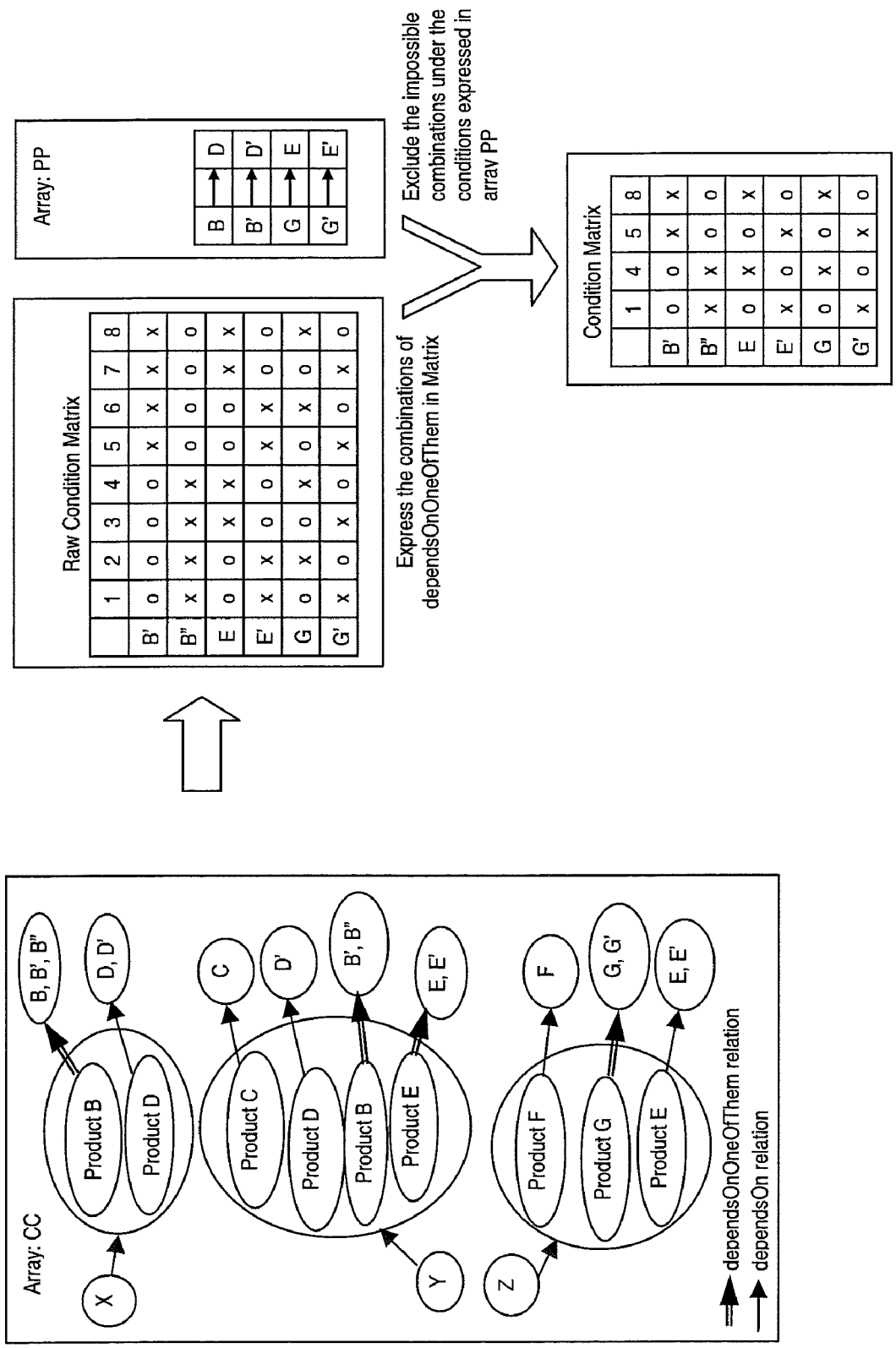
Figure 15:
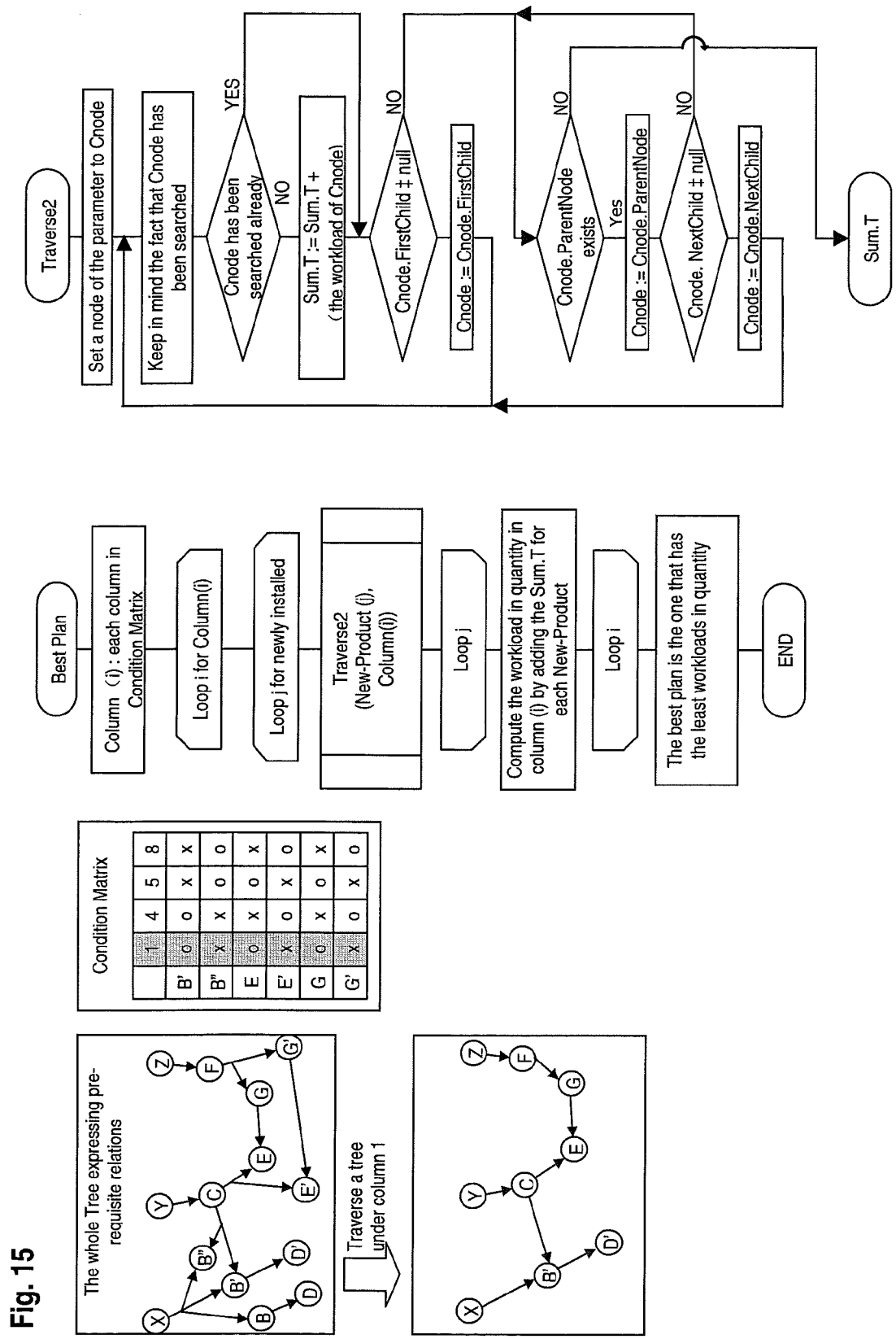

FIG. 6 depicts aspects of the module for evaluating installation plans that result from a re-configuration of applications on the processing system 100. Exemplary display screens providing user interfaces for determining the best configuration of installation are provided in FIGS. 7-10. In these examples, users are provided with at least one logic tree where applications are identified as nodes on the tree. Configuration policies and other such constraints may be used as input to develop a best installation plan. The best installation plan provides, among other things, orders of installation, expected installation times, accounting for relationships and other such results.

As a result, an installation procedure may be provided. Aspects of such a procedure are shown in FIGS. 11-15.

Having thus described aspects of the invention, one skilled in the art will recognize that the teachings herein provide a new solution for configuration management. In particular, the software 120 provides for constructing a pre-requisite relations knowledge database 31 in the CMDB 30. This provides for registering applications and/or components of applications with pre-requisite relations as configuration item (CI) together with various attributes in the CMDB 30. Generally, this permits expression of a pre-requisite relation by utilizing a "relation" of the CMDB 30. Each instance of the configuration item (CI) has several pairs of skill level and installation workloads expressed in a quantitative manner (e.g., installation time needed, etc, . . . ).

The software 120 provides users with an ability to evaluate and show installation workloads in a quantitative manner. More specifically, users are provided with an ability to make trees whose nodes denote newly installed products and which express pre-requisite relations. Then, users may evaluate installation workloads in a quantitative manner by traversing these trees. The processing system 100 (i.e., machine) where each product is installed and the skill level of the person can be specified.

Evaluation of each plan is based upon the latest installation results in the CMDB 30, and users may select whether the evaluation should use installed applications, products and relations. In case where some application or product is not installed in the target processing system 100, but was installed in another platform, the software 120 may be equipped to account for such diversity or variations when evaluating each plan.

The software 120 then provides for making and showing installation steps for each plan. Generally, the installation steps devised for each plan includes time charts for installation procedures.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product comprising machine executable instructions stored on non-transitory machine readable media, the instructions for evaluating one or more installation plans for installing at least one application in at least one processing system, by implementing a method comprising:
    loading a configuration management database (CMDB) for the processing system, the CMDB comprising a pre-requisite relations knowledge database and a configuration information database;
    receiving installation data for an installation of the at least one application;
    determining one or more installation plans for the installation of the application based upon the CMDB and the installation data;
    displaying the one or more installation plans to a user, including an indication of a best installation plan;
        wherein the best installation plan is selected according to a quantitative analysis;
    wherein the pre-requisite relations knowledge database is constructed by registering applications of the processing system; and
    wherein displaying the one or more installation plans to a user includes depicting at least one logic tree.

2. The computer program product as in claim 1, wherein the pre-requisite relations knowledge database comprises workload information and skill information.

3. The computer program product as in claim 1, wherein the configuration information database comprises information regarding one or more relationships between applications of the at least one processing system.

4. The computer program product as in claim 1, wherein the at least one application comprises one of a program, a patch, an update, a revised code, a new release, a new installation, and an obsolete application.

5. The computer program product as in claim 1, wherein the at least one processing system comprises at least one environment.

6. A computing system for managing installation of at least one application, the system comprising:
    a processing system comprising at least one processing, a storage, and memory, with at least one additional application stored in the storage; and
    a computer program product comprising machine executable instructions stored on a non-transitory machine readable media, the instructions for providing an installation plan for installing at least one installation application in at least one processing system, by implementing a method comprising:
    loading a configuration management database (CMDB) for the processing system, the CMDB comprising a pre-requisite relations knowledge database and a configuration information database;
    receiving installation data for an installation of the at least one application;
    determining one or more installation plans for the installation of the application based upon the CMDB and the installation data;
    displaying the one or more installation plans to a user, including an indication of a best installation plan;
    wherein the best installation plan is selected according to a quantitative analysis;
    wherein the pre-requisite relations knowledge database is constructed by registering applications of the processing system; and
    wherein displaying the one or more installation plans to a user includes depicting at least one logic tree.

7. A method comprising:
    loading a configuration management database (CMDB) for a processing system, the CMDB comprising a pre-requisite relations knowledge database and a configuration information database;
    receiving installation data for an installation of an application;
    determining one or more installation plans for the installation of the application based upon the CMDB and the installation data, wherein the best installation plan is selected according to a quantitative analysis; and
    displaying the one or more installation plans to a user, including an indication of a best installation plan;
    wherein the pre-requisite relations knowledge database is constructed by registering applications of the processing system; and
    wherein displaying the one or more installation plans to a user includes depicting at least one logic tree.

8. The method of claim 7, wherein the pre-requisite relations knowledge database is constructed by registering applications present on the processing system.

9. The method of claim 8, wherein the pre-requisite relations knowledge database comprises workload information and skill information.

10. The method of claim 7, wherein the configuration information database comprises information regarding one or more relationships between applications of the processing system.

11. The method of claim 7, wherein the best installation plan is selected according to a quantitative analysis.

* * * * *